April 2, 1968   J. LICHTSTEINER   3,375,691
ARRANGEMENT FOR THE FLANGING, CUTTING, BENDING, TURNING-OVER
OR SHAPING OF DRAWN WORKPIECES OF SHEET METAL
Filed April 8, 1965

INVENTOR
JOHANN LICHTSTEINER

BY Abraham A. Saffitz

ATTORNEY

United States Patent Office 3,375,691
Patented Apr. 2, 1968

3,375,691
ARRANGEMENT FOR THE FLANGING, CUTTING, BENDING, TURNING-OVER OR SHAPING OF DRAWN WORKPIECES OF SHEET METAL
Johann Lichtsteiner, Strengelbach, Switzerland, assignor to Hammerle A.G. Maschinenfabrik, Zofingen, Switzerland
Filed Apr. 8, 1965, Ser. No. 446,639
Claims priority, application Austria, Apr. 17, 1964, A 3,412/64
3 Claims. (Cl. 72—82)

ABSTRACT OF THE DISCLOSURE

A machine for forming and reshaping a flange and the turned-over edges of a drawn sheet metal workpiece in combination with a rotating workpiece carrier fitted with a freely rotating working tool adapted for cutting, bending, shaping and reshaping the edge of said drawn sheet metal workpiece, wherein separate spindles are provided along the same vertical axis of the support mounting the copying roller and the working tool, and wherein a copying cam surface is provided on a rotating plate so that the workpiece which is immobilized on the turntable is brought into positive cam-following movement for the desired cutting, shaping or bending operation.

---

The present invention relates to an arrangement for the flanging, cutting, bending, turning-over or shaping of drawn workpieces of sheet metal, by means of a working tool mounted in a pivotable arm, which tool bears against a copying roller secured on the workpiece carrier.

Similar arrangements are known, in which the workpiece to be worked is secured on a rotating workpiece carrier, the working being effected by means of a cutting, bending or flanging tool, which is received in a pivotable arm and is pressed resiliently yieldably against the workpiece carrier during the rotation thereof. The guidance of the working tool takes place by means of a guiding or copying roller, which rotates with the workpiece carrier and against which a guide roller, secured on the pivot arms, comes to rest. Satisfactory working of the workpiece is difficult when the working tool rotates in a plane which lies perpendicular or nearly perpendicular to the plane which is determined by the edge to be cut. If the working tool consists of a co-operating pair of rollers, the connection line of the roller centre points must always extend perpendicular to the contour line.

It is the purpose of the invention to propose an arrangement in which the working tool is always held in a plane tangential to the contour line of the workpiece. More especially the difficult transition points of the workpiece, where the radius of curvature changes, are to be worked exactly.

The arrangement according to the invention for flanging, cutting, bending, turning-over or shaping drawn workpieces of sheet metal, by means of a working tool mounted in a pivotable arm, which tool bears upon a copying cam surface secured on the workpiece carrier, is characterised in that the working tool is freely rotatably mounted in the pivot arm and is equipped with a feeler member which leads or follows the tool and bears against a guide member rotating with the copying cam surface, which guide member is so shaped that the working tool is held in a plane tangential to the workpiece contour.

Figure 1:
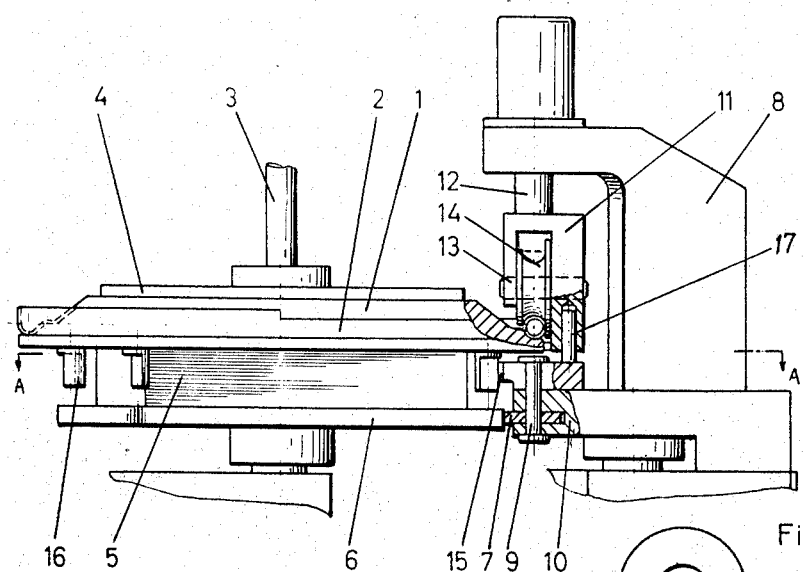
Figure 2:
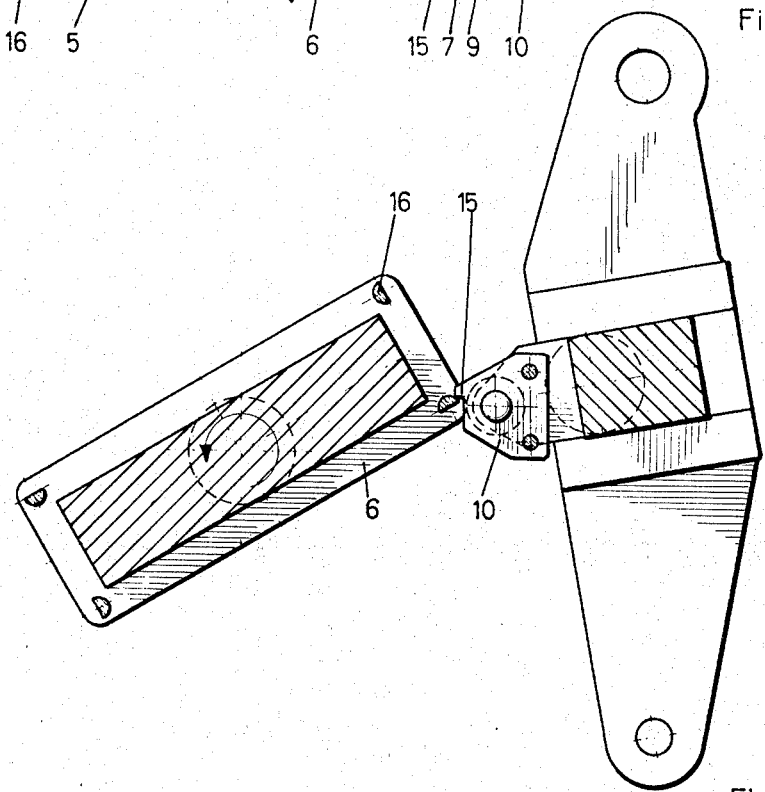

The invention will be further explained hereinafter with reference to an example of embodiment of the object thereof which is illustrated in the accompanying drawing, wherein:

FIGURE 1 shows a lateral elevation of the arrangement, partially in section, and FIGURE 2 shows a section along the line A—A in FIGURE 1.

In the drawing, the workpiece is represented as a metal lid of oval cross-section, and is designated by 1. It is received on a rotating workpiece carrier 2 and held fast by means of a movable presser element 3 with presser plate 4. The workpiece carrier 2 is arranged on a turntable 5 which carries a copying cam surface 6. Against the copying cam surface 6 there bears a copying roller 7, which is mounted in a holder 8 for rotation about a spindle 9. The spindle 9 is arranged in a fork 10, which is connected fast in rotation by means of a pin 17 with a holder 11 for the fork 10. The holder 11 is freely rotatably mounted in the holder 8 by means of a shaft 12. The working tool, for example, a cutting or bending roller 14, is freely rotatably mounted about a spindle 13 in the holder 11.

In the fork 10 there is further arranged a feeler member 15, which is made in dog form and comes to rest on the copying cam surface 6, following the working tool. The copying cam surface 6 is equipped at the transition points with deflecting dogs 16, which are so shaped that the working tool always works in a plane tangential to the contour line of the workpiece.

In this manner a satisfactory guidance of the working tool is achieved, in that the movements of the copying roller 7, which are stabilised by the feeler member 15, are transmitted by the holder 11 to the cutting or bending roller 14.

What I claim is:

1. In a machine for forming and reshaping a flange of a drawn sheet metal workpiece immobilized on a turntable in combination with a rotating workpiece carrier fitted with a freely rotating working tool adapted for cutting, bending, shaping and reshaping the edge of said drawn sheet metal workpiece, a carrier on a turntable which carries said workpiece, a copying cam on said carrier, a copying roller bearing against the surface of said copying cam, said copying roller being rotatably mounted on a spindle along an axis which is in line with the axis of and below said freely rotating working tool, a mounting support for said rotating working tool and for said copying roller, a spindle for said copying roller which is positioned below said rotating working tool, a fork mounting held by a pin in which the rotating working tool is mounted on a separate spindle in said fork, said last named spindle being in line with the spindle which mounts said copying roller, a feeler member which bears against the surface of said copying cam to follow said working tool and deflecting dogs whose surfaces are shaped to position the rotating working tool in a plane which is tangential to the contour of the workpiece, thereby stabilizing the movements between the copying roller and the rotating working tool.

2. A machine as claimed in claim 1, wherein said drawn sheet metal workpiece is held on said turntable by pressing means including a plate.

3. A machine as claimed in claim 2, wherein said pressing means includes a pressing element having a vertical axis which is located along the axis of rotation of said turntable to thereby assure accuracy in the rotational movement of the workpiece relative to said rotating working tool and said copying roller.

References Cited

UNITED STATES PATENTS

| 318,785 | 5/1885 | Moore | 72—83 |
| 1,775,864 | 9/1930 | Olson | 72—83 |
| 2,601,641 | 6/1952 | Simpson et al. | 72—83 |

FOREIGN PATENTS

| 16,084 | 7/1914 | Great Britain. |

RICHARD J. HERBST, *Primary Examiner.*